May 21, 1940.  B. COTTER  2,201,335
FASTENING DEVICE
Filed March 15, 1939
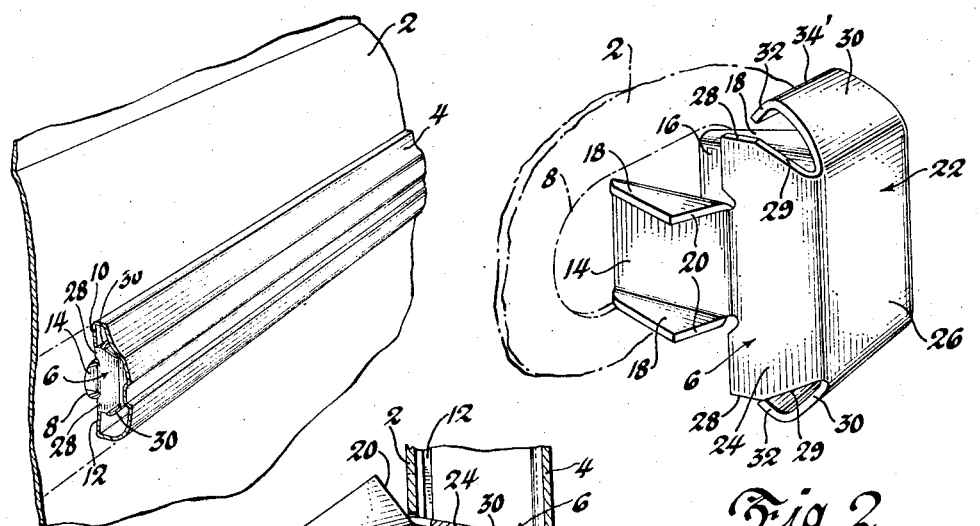
Fig. 1  Fig. 2
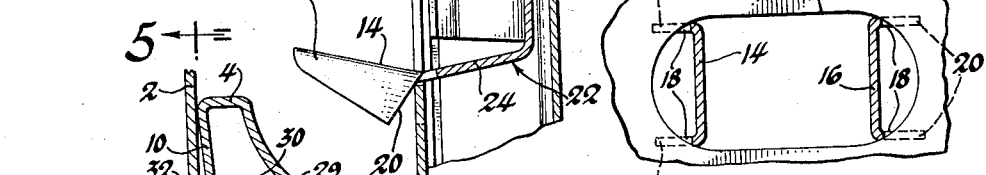
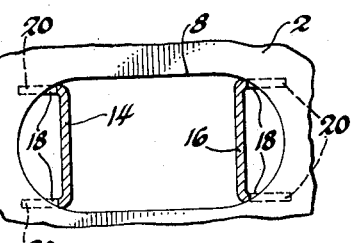
Fig. 4  Fig. 5
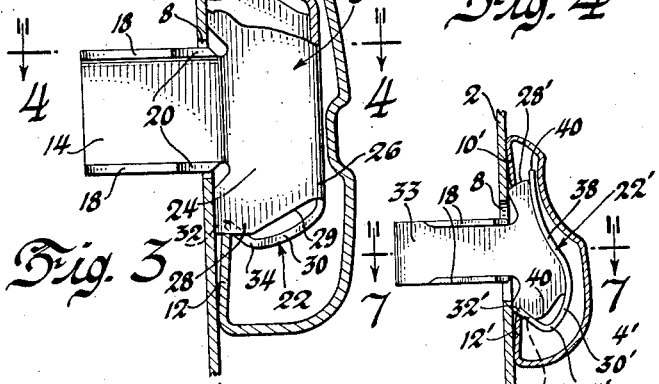
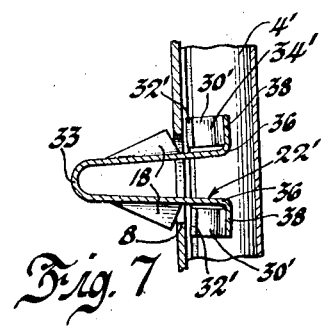
Fig. 3  Fig. 6  Fig. 7
Inventor
Bart Cotter
Blackmore, Spencer & Flint
Attorneys Patented May 21, 1940

2,201,335

UNITED STATES PATENT OFFICE 2,201,335

FASTENING DEVICE

Bart Cotter, Detroit, Mich., assignor to General Motors Corporation, Detroit, Mich., a corporation of Delaware Application March 15, 1939, Serial No. 261,915

5 Claims. (Cl. 24—73)

This invention relates to fastening devices for securing molding or the like to an object such as the side of an automobile body.

In the prior art, fastening devices which have secured a molding strip to an automobile body have not tightly engaged the edge of the molding so that a certain amount of lateral movement of the molding was allowed. With the present device the molding has its edge tightly against an edge or shoulder on the fastening device so that no lateral movement is permitted.

The invention is shown in two species, one of which is adapted for a relatively deep molding and the other for a molding which is narrow at one side or relatively shallow throughout its width, but the same feature of holding the molding against lateral displacement is characteristic of both species.

On the drawing

Figure 1 is a perspective view of a part of an automobile body showing the molding applied thereto by the novel device.

Figure 2 is a perspective view of the fastening device shown in Figure 1.

Figure 3 is a transverse sectional view through the molding and body and showing a part of the clip broken away and in section better to illustrate the construction.

Figures 4 and 5 are views on the lines 4—4 and 5—5 of Figure 3.

Figure 6 is a view corresponding to Figure 3 of a modification.

Figure 7 is a sectional view on the line 7—7 of Figure 6.

Referring to the drawing, the numeral 2 indicates any suitable object to which the invention may be applied; in this instance it designates the wall of an automobile body. The body 2 has the molding 4 secured thereto by means of fastening devices or clips 6 which form the object of the invention. The clips are secured to the body by passing a part thereof through suitable openings 8 provided in the body 2.

Instead of the molding 4, any other suitable device or structure may be secured in place.

Referring to Figure 3, it will be seen that the molding is generally U shape in cross section and has the inturned edge flanges 10 and 12. The flanges in addition to being inwardly turned from the edge of the molding are also sprung slightly inwardly toward the mouth or opening in the U.

The novel clip of the invention is best shown in Figure 2. The clip has the securing part comprising the tongues 14 and 16 which have the right angularly bent flanges 18. These flanges are triangular in shape as shown and the edges 20 thereof are adapted to strike against the underside of the opening 8, as is best shown in Figure 4, to retain the fastening device in place.

The fastening device has the head or securing part 22 comprising the side wings 24 and the top 26. The side wings 24 have the end edges or shoulders 28 the upper part of which is inclined as shown at 29. The ends of the top part 26 are formed into the spring fingers 30, the ends 32 of the fingers being return bent toward the head 22.

The tongues 14 and 16, wings 24 and top 26 of the clip form a substantially U-shaped element and when it is desired to apply the fastening device to an opening the tongues 14 are bent toward each other so that they may enter the opening 8 and after they have been passed into the opening the resiliency of the wings 24 will spread the tongues outwardly so that the edges 20 of the flanges 18 will engage the underside of the wall 2 adjacent the opening 8 as shown in Figure 4.

The manner in which the molding is applied is perhaps best understood from an examination of Figure 4. The molding 4 with its edges 10 and 12 is placed over the head 22 of the securing device and by pressing inwardly on the molding the bent-in edges 10 and 12 will force the spring tongues 30 toward each other; the edges of the bent-in flanges 10 and 12 will finally slip over the peak 34 of the tongues and rest against the shoulders or edges 28. In this position the ends of the spring tongues 30 are constantly pressed against the edges of the flanges 10 and 12 while these edges themselves are tightly against the shoulders or edges 28 of the wings 24. As will be seen in Figure 3, the molding 4 is held from lateral movement by engagement with the shoulder or edges 28 of the wings 24.

Referring to Figure 6, a second species of the invention is shown. In this instance, a U-shaped connecting part 33 extends inside the opening 8 while the outer part, conforming to the head 22 of the species of Figure 2, is divided into wings 36 forming a head 22'. The ends of these wings are laterally bent or flanged as at 38 and one end of the bends 38 as shown at 40 extends beyond the end shoulder 28'. The other end of the flanges 38 is formed into a spring finger 30' having a peak 34' and an inturned end 32'. This clip has two inclined shoulders 28' which perform the same function as the shoulders or edges 28 in the species of Figure 2 but as the molding 4' in the species of Figures 6 and 7 is much shallower at one side, the spring fingers 30' are used on the one side only. On the shallower side of the molding 4' or at the upper part of Figure 6, the inturned side flange 10' is first slipped under the leg or extension 40 and the opposite flange 12' is then pressed or snapped over the peak 34' of the spring fingers 30', the spring fingers 30' yielding inwardly to allow the edge 12' to abut against the shoulder at 28'. At the same time the edge of the flange 10' will abut against the other shoulder 28' and hold the molding 4' from lateral motion. The molding 4', of course, is yieldable and will slip over the apex 40 at the lower side edge of the shoulder 28' shown in Figure 6.

With the parts shown in Figure 6, the turned-in edges 10' and 12' will be against the shoulders 28' while the spring fingers 30' will press against the edge of the inturned flange 12'. Because the edges 28' in this species are slightly inclined, the molding 4' will be securely held in place.

The flanges 18 in the species of Figures 6 and 7 are the same as the corresponding parts 18 in Figure 2 and are formed as integral right-angularly bent flanges as a part of the U-shaped tongue 33 which performs the same function as the two tongues 14 in the species of Figure 2.

In the invention of both species the heads 32 or 32' are capable of allowing their spring fingers 30 or 30' to flex without affecting or flexing the tongues 14 or 33. This feature is of advantage in that when the moulding is applied, the application thereof to the heads 32 or 32' will not disturb the tongues 14 or 33 and their contact with the sides of the openings to which they are applied.

I claim:

1. In a fastening device for securing a molding or the like to an object, said device having means to secure the device to the object and a head on which to mount the molding, laterally spaced wings on said head, shoulders on the ends of said wings, said shoulders being engaged by the molding or the like to prevent lateral movement thereof, and spring fingers on the head extending beyond the wings and the shoulders on one side, said spring fingers being capable of yielding when the molding or the like is pressed thereover, said fingers engaging the molding or the like to retain it on the object.

2. In a fastening device for securing a molding or the like to an object, said device having means to secure the device to the object and a head on which to mount the molding, laterally spaced wings on said head, a plurality of shoulders on the ends of said wings, said shoulders adapted to be engaged by the edge of the molding and prevent lateral movement thereof, a plurality of spring fingers on the head, said fingers being between the wings and the shoulders, said fingers adapted to yield to pressure from the edge of the molding when the molding is applied to cause the finger to allow the molding to slip thereover and engage the shoulders, said finger preventing the withdrawal of the molding after it has been snapped into place.

3. In a fastening device for securing a molding or the like to an object, an attaching part comprising two tongues adapted to project into an opening in the object, said tongues being resiliently connected to enable them to move toward each other in order that they may be inserted into the opening, flanges on said tongues to engage the edge of the opening to hold the device on the object, a securing part adapted to be engaged by and hold the molding on the object, two wings on said securing part, said wings forming continuations of the tongues of the attaching part, said wings being larger than the opening to prevent the securing part from passing through the opening, a finger on the wings, said finger being yieldable to enable the molding to be snapped over the securing part, the ends of said wings being inclined to enable an easy application of the molding and said molding engaging at its edges the inclined ends to hold the molding in place and prevent its lateral displacement.

4. In a fastening device for securing a molding or the like to an object, a head on said device comprising flat spaced lateral wings joined by a top, the edges of said wings adjacent the object being in engagement with the object, said wings having their end edges adapted to be engaged by the edge of the molding when snapped into place to prevent the lateral movement of the molding, said end edges having an inclined part to enable an easy application of the molding or the like, extensions on the top forming spring fingers projecting between and beyond the end edges of the wings and adapted to yield when the molding is snapped into place, and means on the wings to enable the device to be applied and secured in an opening formed in the object to which the molding is to be attached.

5. In a fastening device for securing a molding or the like to an object, a head on said device comprising flat spaced wings, edges on the ends of the wings adapted to be engaged by the edge of the molding when in place to prevent the lateral movement of the molding, spring fingers on the top projecting beyond and between the end edges of the wings and adapted to yield when the molding is applied, said spring fingers pressing against the molding when in position to prevent the withdrawal of the molding, and means to hold the device to the object.

BART COTTER.